(12) United States Patent
Zhang

(10) Patent No.: US 11,878,650 B2
(45) Date of Patent: Jan. 23, 2024

(54) SAFETY BELT AUTOMATIC ADJUSTMENT APPARATUS AND CHILD SAFETY SEAT THEREWITH

(71) Applicant: Bambino Prezioso Switzerland AG, Steinhausen (CH)

(72) Inventor: Da Liang Zhang, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/875,442

(22) Filed: Jul. 28, 2022

(65) Prior Publication Data

US 2022/0363218 A1   Nov. 17, 2022

Related U.S. Application Data

(63) Continuation of application No. 17/093,520, filed on Nov. 9, 2020, now Pat. No. 11,427,152.

(30) Foreign Application Priority Data

Nov. 11, 2019   (CN) .......................... 201911095674.3

(51) Int. Cl.
*B60N 2/28* (2006.01)
*B60R 22/34* (2006.01)
(Continued)

(52) U.S. Cl.
CPC .......... *B60R 22/341* (2013.01); *B60N 2/2812* (2013.01); *B60R 22/105* (2013.01); *B60R 22/18* (2013.01)

(58) Field of Classification Search
CPC ..... B60R 22/341; B60R 22/105; B60R 22/18; B60R 22/357; B60R 22/26; B60R 22/34;
(Continued)

(56) References Cited

U.S. PATENT DOCUMENTS 3,750,102 A   7/1973 Okada
3,974,979 A   8/1976 Fieni
(Continued)

FOREIGN PATENT DOCUMENTS

EP   1 088 695 A2   4/2001
EP   1 623 892 A1   2/2006
(Continued)

OTHER PUBLICATIONS

"International Search Report" dated Dec. 7, 2020 for International application No. PCT/EP2020/081627, International filing date:Nov. 10, 2020.

*Primary Examiner* — Keith J Frisby
(74) *Attorney, Agent, or Firm* — Winston Hsu

(57) ABSTRACT

A safety belt automatic adjustment apparatus includes a safety belt buckle fastening assembly, a safety belt retractor and a linking component. The safety belt buckle fastening assembly is rotatably connected to a seat body of a child safety seat and for connecting with a safety belt buckle. The safety belt retractor is used for retracting a safety belt, and the safety belt retractor includes a restraining assembly for restraining a movement of the safety belt in a predetermined direction. The linking component is installed between the safety belt buckle fastening assembly and the safety belt retractor, and the safety belt buckle fastening assembly rotates to drive the linking component and the restraining assembly, so as to restrain or release the safety belt winding around the safety belt retractor. The safety belt automatic adjustment apparatus has advantages of automatic adjustment for the safety belt, simple structure, convenient operation and enhanced safety.

16 Claims, 6 Drawing Sheets

(51) Int. Cl.
*B60R 22/10* (2006.01)
*B60R 22/18* (2006.01)

(58) Field of Classification Search
CPC ............... B60N 2/2812; B60N 2/2803; B60N 2002/2815
See application file for complete search history.

(56) References Cited

U.S. PATENT DOCUMENTS

| | | |
|---|---|---|
| 4,135,683 A | 1/1979 | Stephenson |
| 4,337,906 A | 7/1982 | Colasanti |
| 4,391,420 A | 7/1983 | Ahad |
| 4,420,127 A | 12/1983 | Kondziola |
| 4,720,148 A | 1/1988 | Anthony |
| 5,061,012 A | 10/1991 | Parker |
| 5,380,066 A | 1/1995 | Wiseman |
| 5,398,997 A | 3/1995 | McFalls |
| 5,484,190 A | 1/1996 | Corrion |
| 5,503,461 A | 4/1996 | Schreier |
| 5,511,856 A | 4/1996 | Merrick |
| 5,611,603 A | 3/1997 | Gray |
| 5,779,319 A | 7/1998 | Merrick |
| 5,799,894 A | 9/1998 | Kohlndorfer |
| 6,371,563 B1 | 4/2002 | Washizuka |
| 8,444,222 B2 * | 5/2013 | Buckingham ........ B60N 2/2806 297/256.16 |
| 8,944,503 B2 * | 2/2015 | Gates ................... B60N 2/2851 297/475 |
| 10,173,553 B2 * | 1/2019 | Mitchell .............. B60N 2/2872 |
| 10,328,894 B2 | 6/2019 | Geist |
| 10,894,491 B2 * | 1/2021 | Persson ................ B60N 2/2812 |
| 2004/0251722 A1 | 12/2004 | Boyle |
| 2007/0069060 A1 | 3/2007 | Maciejczyk |
| 2009/0065621 A1 | 3/2009 | Woellert |
| 2012/0074758 A1 | 3/2012 | Gates |
| 2017/0144624 A1 | 5/2017 | Geist |
| 2017/0267210 A1 | 9/2017 | Jaradi |
| 2020/0346566 A1 | 11/2020 | Frank |

FOREIGN PATENT DOCUMENTS

| | | |
|---|---|---|
| GB | 2 175 194 A | 11/1986 |
| JP | 61-261150 A | 11/1986 |
| KR | 2002-0037704 A | 5/2002 |
| TW | 433217 | 5/2001 |
| WO | 2017/220738 A1 | 12/2017 |

* cited by examiner

SAFETY BELT AUTOMATIC ADJUSTMENT APPARATUS AND CHILD SAFETY SEAT THEREWITH

CROSS REFERENCE TO RELATED APPLICATIONS

This application is a continuation application of U.S. application Ser. No. 17/093,520, filed on Nov. 9, 2020. The content of the application is incorporated herein by reference.

BACKGROUND OF THE INVENTION

1. Field of the Invention

The present invention relates to a safety belt automatic adjustment apparatus and a child safety seat therewith, and more particularly, to a safety belt automatic adjustment apparatus and a child safety seat having advantages of automatic adjustment for a safety belt, simple structure, convenient operation and enhanced safety.

2. Description of the Prior Art

In order to enhance safety of riding in motor vehicles, a child safety seat is adapted for children at the age of 0 to 12 years. Besides the safety concern, convenience is another important topic of the child safety seat. For children of different ages and different body shapes, a safety belt on the child safety seat often needs to be adjusted. However, conventional safety belt adjustment is often troublesome. The safety belt passes through a bottom of the child safety seat and is exposed in front of the child safety seat. A bottom of the safety belt needs to be pulled by hand for adjusting a length of the safety belt, and the safety belt can be locked at a desired position by a webbing locking component inside, which is very inconvenient and not suitable for people's current needs. Therefore, it is necessary to provide an improved safety belt automatic adjustment apparatus with simple structure, convenient operation and enhanced safety for solving the aforementioned problems.

SUMMARY OF THE INVENTION

Therefore, an objective of the present invention is to provide a safety belt automatic adjustment apparatus and a child safety seat having advantages of automatic adjustment for a safety belt, simple structure, convenient operation and enhanced safety, for solving the aforementioned problems.

In order to achieve the aforementioned objective, the present invention discloses a safety belt automatic adjustment apparatus including a safety belt buckle fastening assembly, a safety belt retractor and a linking component. The safety belt buckle fastening assembly is rotatably connected to a seat body of a child safety seat and for connecting with a safety belt buckle. The safety belt retractor is used for retracting a safety belt, and the safety belt retractor includes a restraining assembly for restraining a movement of the safety belt in a predetermined direction. The restraining assembly includes a first restraining component and a second restraining component. The safety belt retractor further includes a rotating shaft, and the safety belt winds around the rotating shaft. The linking component is installed between the safety belt buckle fastening assembly and the safety belt retractor, and the safety belt buckle fastening assembly rotates to drive the linking component and the restraining assembly, so as to restrain or release the safety belt winding around the safety belt retractor. The first restraining component and the second restraining component are driven by the linking component for respectively restraining rotations in opposite directions of the rotating shaft.

Preferably, the safety belt retractor further includes a retractor installation component, a first ratchet and a second ratchet. The first ratchet is connected to an end of the rotating shaft, and the second ratchet is connected to another end of the rotating shaft.

Preferably, the first restraining component is installed on the retractor installation component in a swingable manner and for selectively engaging with or separating from the first ratchet, and a rotation in a first direction of the rotating shaft is restrained when the first ratchet is engaged with the first restraining component.

Preferably, the first restraining component is resiliently installed on the retractor installation component by a first resilient component.

Preferably, the second restraining component is installed on the retractor installation component in a swingable manner and for selectively engaging with or separating from the second ratchet, and a rotation in a second direction opposite to the first direction of the rotating shaft is restrained when the second ratchet is engaged with the second restraining component.

Preferably, the second restraining component is resiliently installed on the retractor installation component by a second resilient component.

Preferably, a first end of the linking component is fixed on the safety belt buckle fastening assembly, and a second end of the linking component abuts against the first restraining component.

Preferably, an abutting surface is formed on the second end of the linking component, and a mating surface is formed on the first restraining component for abutting against the abutting surface.

Preferably, the safety belt buckle fastening assembly includes an installation component, a rotary shaft installed on the installation component, and an insertion component connected to the rotary shaft and for connecting with the safety belt buckle.

In order to achieve the aforementioned objective, the present invention further discloses a child safety seat including a seat body, a safety belt, a safety belt buckle connected to the safety belt, and the aforesaid safety belt automatic adjustment apparatus for connecting with the safety belt buckle.

In summary, the safety belt retractor can be locked or released by adjusting statuses of the safety belt buckle fastening assembly of the safety belt automatic adjustment apparatus of the present application, so as to lock or release the safety belt automatically. When a child sits on the child safety seat and the safety belt buckle fastening assembly buckles with the safety belt buckle, the safety belt can be tightened automatically, which has advantages of automatic adjustment for the safety belt without manual adjustment, simple structure, convenient operation and enhanced safety.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
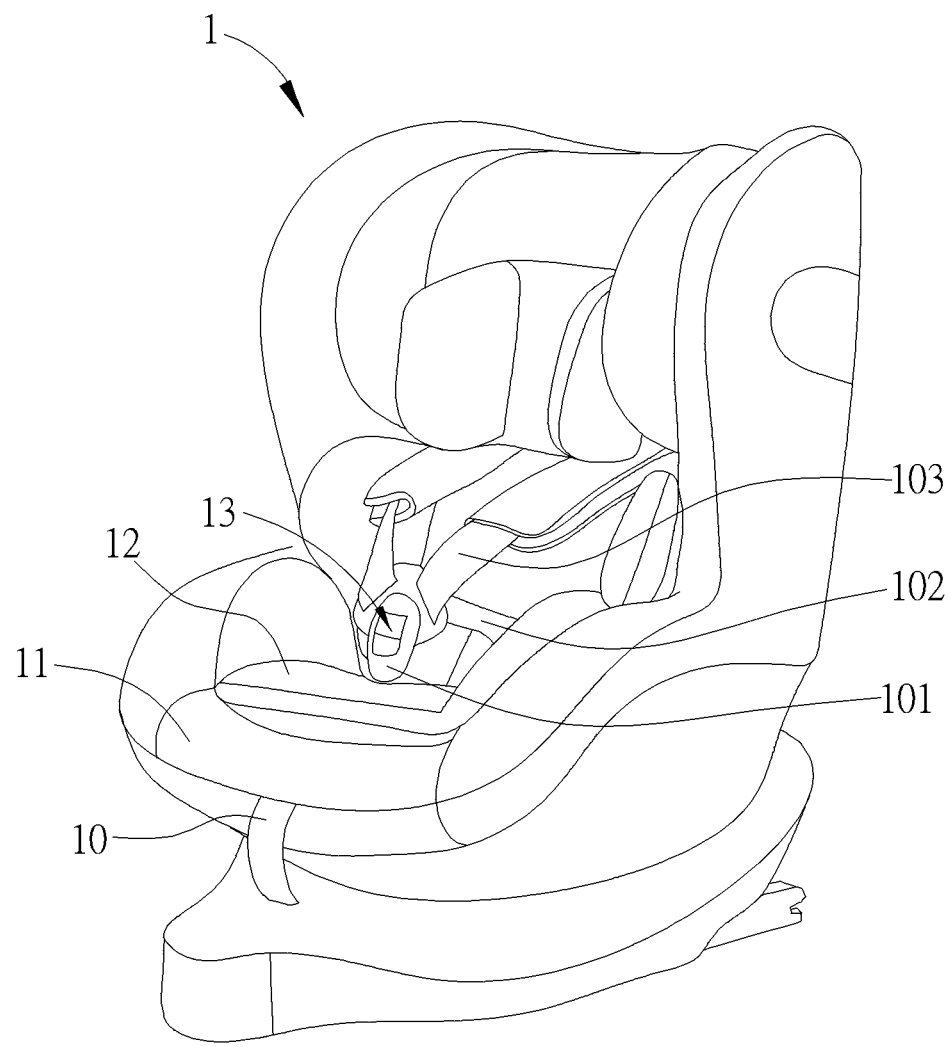
FIG. 1 is a schematic drawing of a child safety seat according to an embodiment of the present application.
Figure 2:
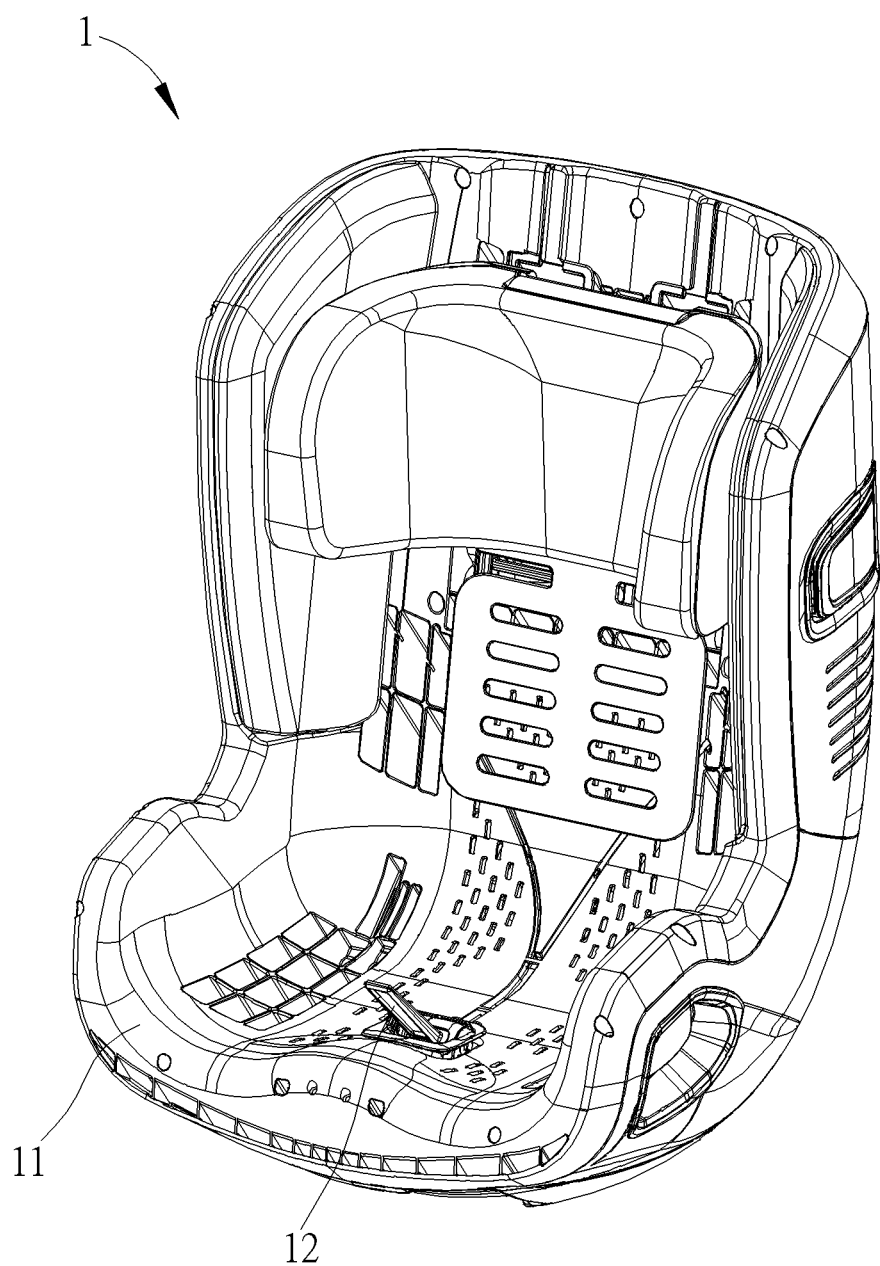
FIG. 2 is a diagram of a seat body of the child safety seat according to the embodiment of the present application.
Figure 3:
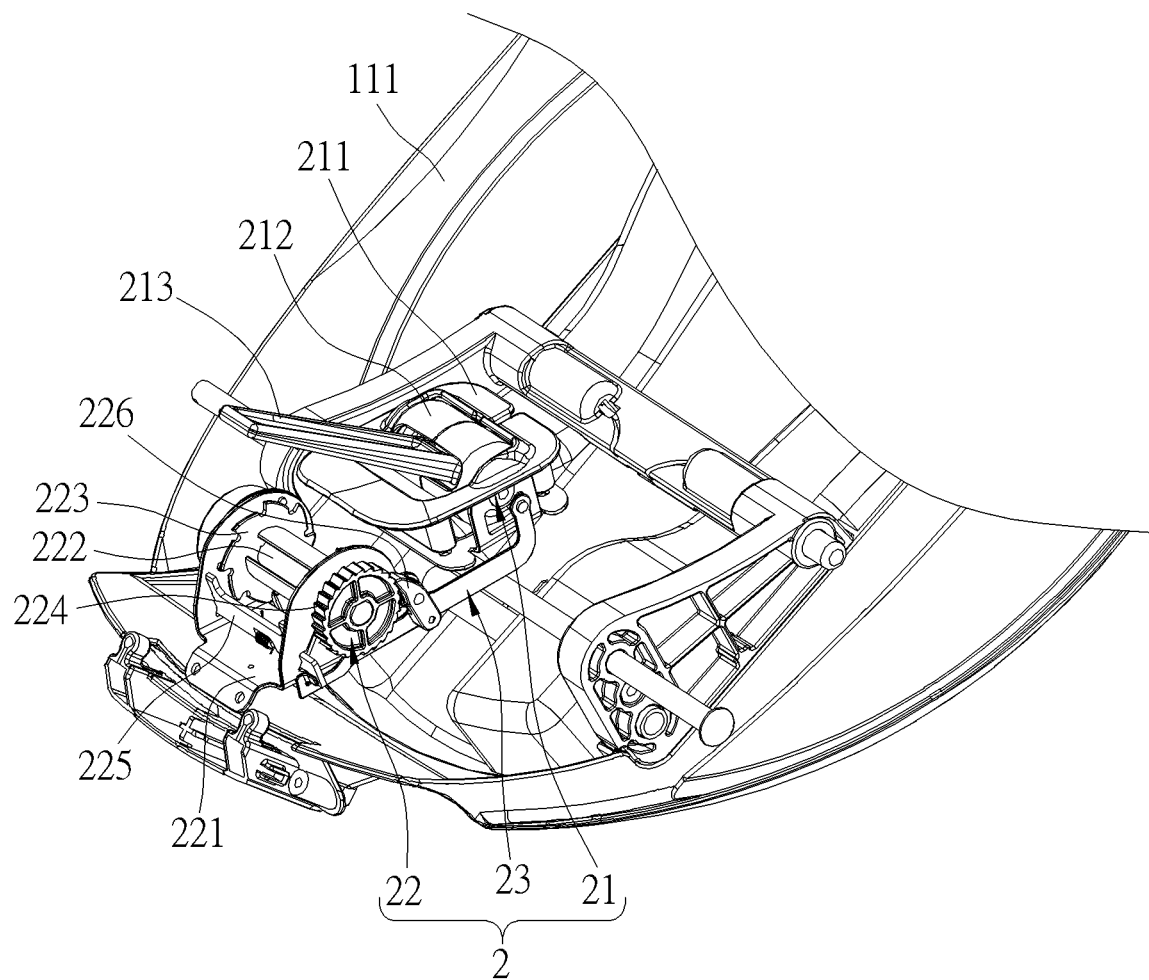
FIG. 3 is a diagram of a safety belt automatic adjustment apparatus in a releasing status according to the embodiment of the present application.
Figure 4:
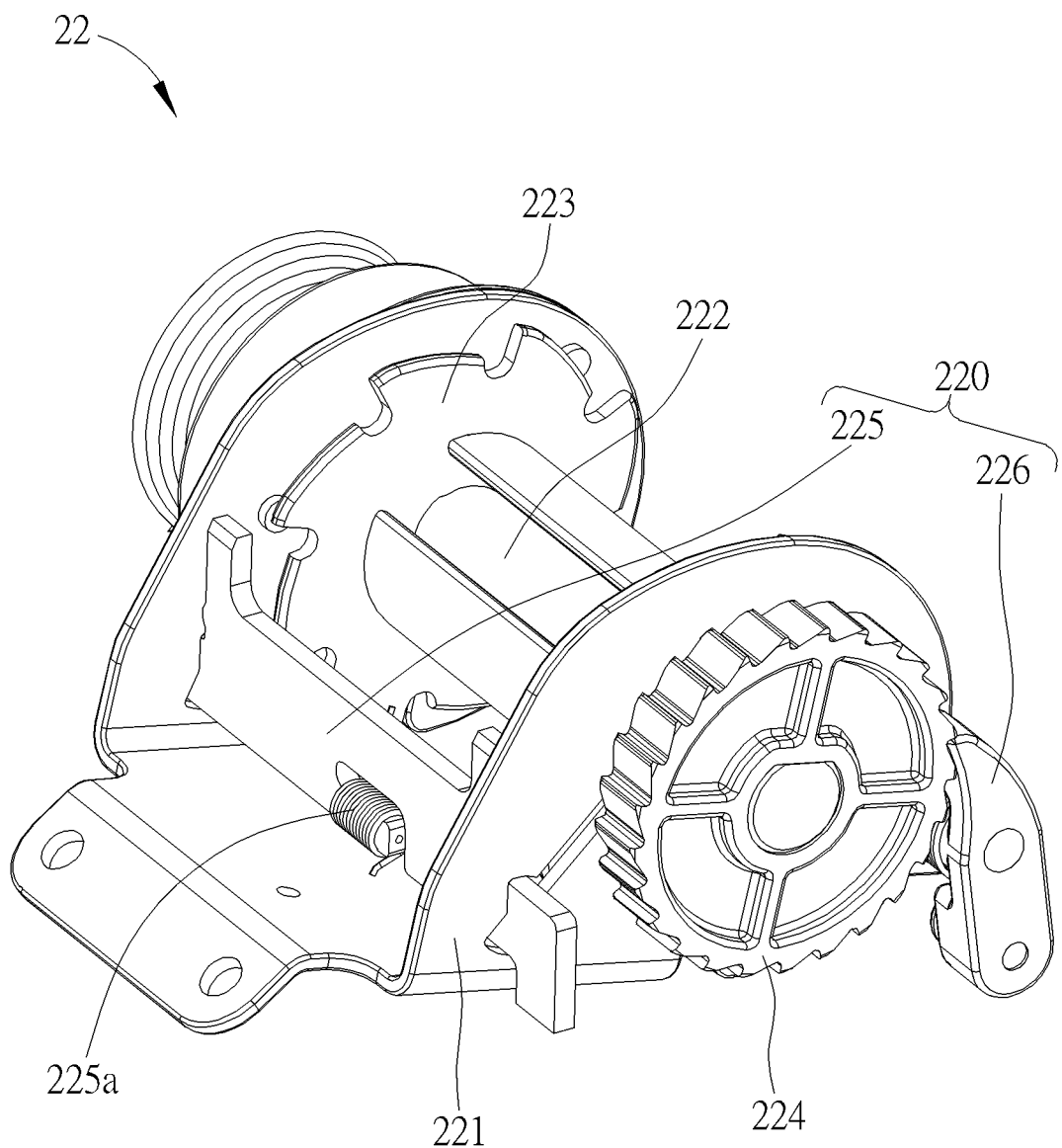
FIG. 4 is a diagram of a safety belt retractor of the safety belt automatic adjustment apparatus in the releasing status according to the embodiment of the present application.
Figure 5:
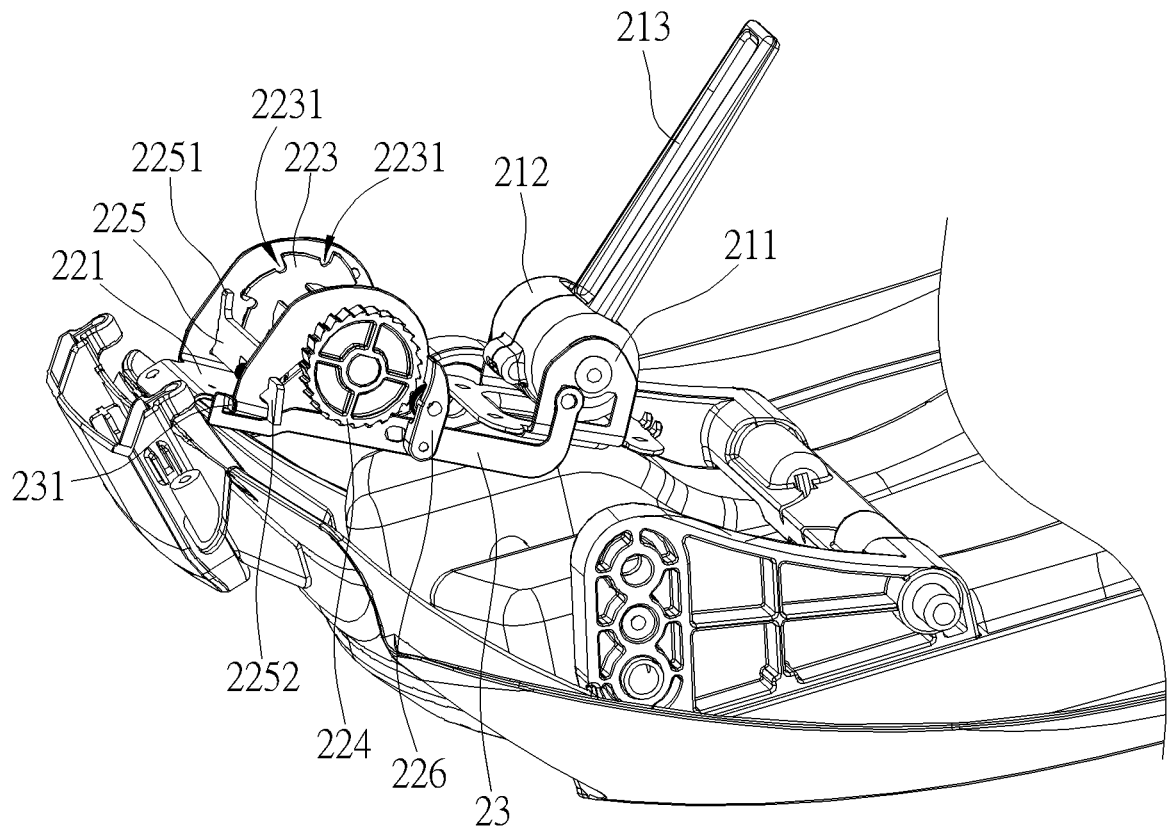
FIG. 5 is a diagram of the safety belt automatic adjustment apparatus in a restraining status according to the embodiment of the present application.
Figure 6:
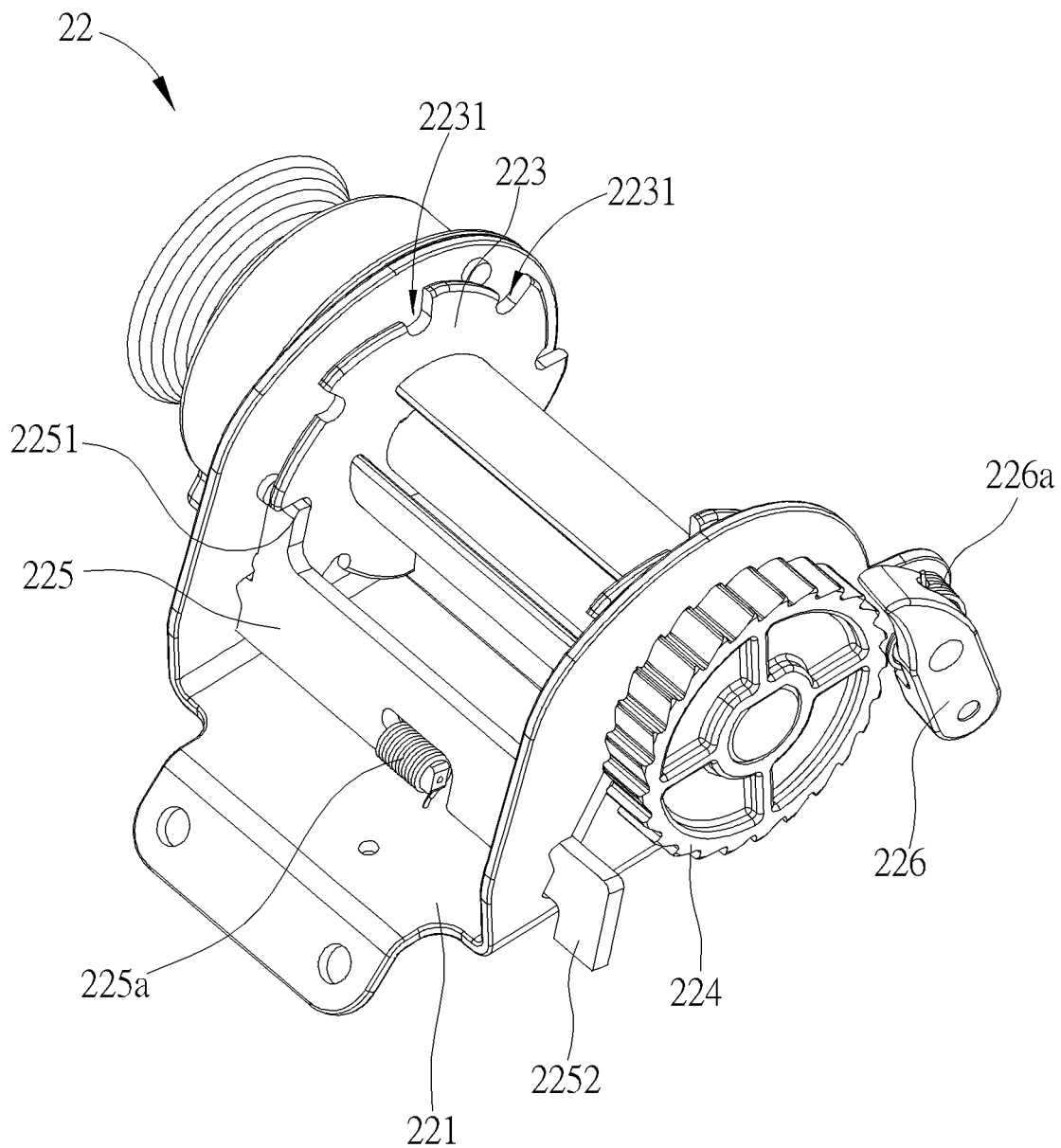
FIG. 6 is a diagram of the safety belt retractor of the safety belt automatic adjustment apparatus in the restraining status according to the embodiment of the present application.

Please refer to FIG. 1 to FIG. 6. FIG. 1 is a schematic drawing of a child safety seat 1 according to an embodiment of the present application. FIG. 2 is a diagram of a seat body 11 of the child safety seat 1 according to the embodiment of the present application. FIG. 3 is a diagram of a safety belt automatic adjustment apparatus 2 in a releasing status according to the embodiment of the present application. FIG. 4 is a diagram of a safety belt retractor 22 of the safety belt automatic adjustment apparatus 2 in the releasing status according to the embodiment of the present application. FIG. 5 is a diagram of the safety belt automatic adjustment apparatus 2 in a restraining status according to the embodiment of the present application. FIG. 6 is a diagram of the safety belt retractor 22 of the safety belt automatic adjustment apparatus 2 in the restraining status according to the embodiment of the present application. The child safety seat 1 includes the seat body 11 and a seat pad 12 installed on the seat body 11. The child safety seat 1 further includes a safety belt 10 and a safety belt buckle 13 connected to the safety belt 10. The safety belt 10 includes a cross belt 101, a waist belt 102 and two shoulder belts 103. The child safety seat 1 further includes the safety belt automatic adjustment apparatus 2 for connecting or buckling with the safety belt buckle 13. When a child is seated on the child safety seat 1, the safety belt 10 can be tightened automatically after the safety belt buckle 13 is buckled with the safety belt automatic adjustment apparatus 2 without manual adjustment.

As shown in FIG. 3, the safety belt automatic adjustment apparatus 2 is installed in a base 111 of the seat body 11 of the child safety seat 1. The safety belt automatic adjustment apparatus 2 includes a safety belt buckle fastening assembly 21, the safety belt retractor 22, and a linking component 23 installed between the safety belt buckle fastening assembly 21 and the safety belt retractor 22. Specifically, the safety belt buckle fastening assembly 21 is rotatably connected to the seat body 11 and protrudes from the base 111 of the seat body 11. The safety belt buckle fastening assembly 21 is configured to buckle with the safety belt buckle 13. The safety belt buckle fastening assembly 21 includes an installation component 211, a rotary shaft 212 installed on the installation component 211, and an insertion component 213 connected to the rotary shaft 211 and for connecting or buckling with the safety belt buckle 13.

The linking component 23 is installed between the safety belt buckle fastening assembly 21 and the safety belt retractor 22. Specifically, a first end of the linking component 23 is fixed on the rotary shaft 212 of the safety belt buckle fastening assembly 21, and a second end of the linking component 23 extends to abut against the safety belt retractor 22. The linking component 23 can move forward or backward with rotation of the safety belt buckle fastening assembly 21, so as to restrain or release the safety belt 10 winding around the safety belt retractor 22.

As shown in FIG. 4 and FIG. 6, the safety belt retractor 22 includes a retractor installation component 221, a rotating shaft 222, a first ratchet 223 and a second ratchet 224. The safety belt 10 winds around the rotating shaft 222. The first ratchet 223 is connected to an end of the rotating shaft 222, and the second ratchet 224 is connected to another end of the rotating shaft 222. Specially, the first ratchet 223 and the second ratchet 224 can be fixed with the rotating shaft 222, and directions of teeth of the first ratchet 223 and the second ratchet 224 are opposite to each other. That is, when the first ratchet 223 is restrained, the second ratchet 224 is released, and when the second ratchet 224 is restrained, the first ratchet 223 is released.

As shown in FIG. 4, the safety belt retractor 22 includes a restraining assembly 220 for restraining movement of the safety belt 10 in a predetermined direction. Preferably, the restraining assembly 220 includes a first restraining component 225 installed on the retractor installation component 221 in a swingable manner and for selectively engaging with or separating from the first ratchet 223, and a second restraining component 226 installed on the retractor installation component 221 in a swingable manner and for selectively engaging with or separating from the second ratchet 224. A rotation in a first direction of the rotating shaft 222 can be restrained when the first ratchet 223 is engaged with the first restraining component 225, and a rotation in a second direction opposite to the first direction of the rotating shaft 222 can be restrained when the second ratchet 224 is engaged with the second restraining component 226.

Specifically, as shown in FIG. 3 to FIG. 6, the first restraining component 225 is installed on a side of the rotating shaft 222, and the first restraining component 225 can be resiliently installed on the retractor installation component 221 by a first resilient component 225a, such as a torsional spring, in a swingable manner. The first restraining component 225 can be formed in a plate shape and made of metal material. A protruding portion 2251 is formed on an end of the first restraining component 225 and configured to engage with sunken portions 2231 of the first ratchet 223. A mating surface 2252 is formed on another end of the first restraining component 225 and configured to abut against an abutting surface 231 formed on the second end of the linking component 23. The first restraining component 225 can be driven by the linking component 23 for selectively engaging with or separating from the first ratchet 223. The second restraining component 226 is installed on another side of the rotating shaft 222 and located in a position adjacent to the second ratchet 224, and the second restraining component 226 can be resiliently installed on the retractor installation component 221 by a second resilient component 226a, such as a torsional spring, in a swingable manner. The second restraining component 226 can be driven by the linking component 23 for selectively engaging with or separating from the second ratchet 224. Specifically, a middle portion of the second restraining component 226 is installed on the retractor installation component 221 via a pivot, an end of the second restraining component 226 is connected to the linking component 23, and another end of the second restraining component 226 cooperates with the second ratchet 224.

Specifically, when a child does not sit on the child safety seat 1 and the safety belt buckle fastening assembly 21 does not buckle with the safety belt buckle 13, the safety belt automatic adjustment apparatus 2 is in the releasing status as shown in FIG. 3. At this time, the safety belt automatic adjustment apparatus 2 faces forwardly, the second end of the linking component 23 abuts against the first restraining component 225, the first restraining component 225 separates from the first ratchet 223, the end of the second restraining component 226 is connected to the linking component 23, and the second resilient component 226a can drive the another end of the second restraining component 226 to engage with the second ratchet 224, as shown in FIG. 4. In the releasing status, a clockwise rotation of the second ratchet 224 is restrained, a counterclockwise rotation of the second ratchet 224 is not restrained, and the first ratchet 223 can rotate in a counterclockwise direction with the second ratchet 224. That is, the safety belt retractor 2 can be rotated in the counterclockwise direction, so that the safety belt 10 can be released and pulled out.

When a child sits on the child safety seat 1 and the safety belt buckle fastening assembly 21 buckles with the safety belt buckle 13, the safety belt automatic adjustment apparatus 2 is in the restraining status as shown in FIG. 5. When the safety belt buckle fastening assembly 21 is pushed from a position as shown in FIG. 3 to a position as shown in FIG. 5 along an arrow direction, the linking component 23 is driven forwardly along the arrow direction with the safety belt buckle fastening assembly 21 to separate from the first restraining component 225, and the first resilient component 225a can drive the first restraining component 225 without being abutted by the linking component 23 to rotate toward the first ratchet 223 so as to engage with the first ratchet 223. At this time, the second restraining component 226 is driven by the linking component 23 to move away from the second ratchet 223, so as to disengage from the second ratchet 224, as shown in FIG. 6. In the restraining status, a counterclockwise rotation of the first ratchet 223 is restrained, a clockwise rotation of the first ratchet 223 is not restrained, and the second ratchet 224 can rotate in a clockwise direction with the first ratchet 223. That is, the safety belt retractor 2 can be rotated in the clockwise direction, so that the safety belt 10 can be retracted and tightened by the safety belt retractor 2 automatically.

In contrast to the prior art, the safety belt retractor can be locked or released by adjusting statuses of the safety belt buckle fastening assembly of the safety belt automatic adjustment apparatus of the present application, so as to lock or release the safety belt automatically. When a child sits on the child safety seat and the safety belt buckle fastening assembly buckles with the safety belt buckle, the safety belt can be tightened automatically, which has advantages of automatic adjustment for the safety belt without manual adjustment, simple structure, convenient operation and enhanced safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt automatic adjustment apparatus comprising:
   a safety belt buckle fastening assembly rotatably connected to a seat body of a child safety seat and for connecting with a safety belt buckle;
   a safety belt retractor for retracting a safety belt, the safety belt retractor comprising:
      a restraining assembly for restraining a movement of the safety belt in a predetermined direction, the restraining assembly comprising a first restraining component and a second restraining component; and
      a rotating shaft, the safety belt winding around the rotating shaft; and
   a linking component installed between the safety belt buckle fastening assembly and the safety belt retractor, the safety belt buckle fastening assembly rotating to drive the linking component and the restraining assembly, so as to restrain or release the safety belt winding around the rotating shaft;
   wherein the first restraining component and the second restraining component are driven by the linking component for respectively restraining rotations in opposite directions of the rotating shaft, a first end of the linking component is fixed on the safety belt buckle fastening assembly, and a second end of the linking component abuts against the first restraining component.

2. The safety belt automatic adjustment apparatus of claim 1, wherein the safety belt retractor further comprises:
   a retractor installation component;
   a first ratchet connected to an end of the rotating shaft; and
   a second ratchet connected to another end of the rotating shaft.

3. The safety belt automatic adjustment apparatus of claim 2, wherein the first restraining component is installed on the retractor installation component in a swingable manner and for selectively engaging with or separating from the first ratchet, and a rotation in a first direction of the rotating shaft is restrained when the first ratchet is engaged with the first restraining component.

4. The safety belt automatic adjustment apparatus of claim 3, wherein the first restraining component is resiliently installed on the retractor installation component by a first resilient component.

5. The safety belt automatic adjustment apparatus of claim 3, wherein the second restraining component is installed on the retractor installation component in a swingable manner and for selectively engaging with or separating from the second ratchet, and a rotation in a second direction opposite to the first direction of the rotating shaft is restrained when the second ratchet is engaged with the second restraining component.

6. The safety belt automatic adjustment apparatus of claim 5, wherein the second restraining component is resiliently installed on the retractor installation component by a second resilient component.

7. The safety belt automatic adjustment apparatus of claim 1, wherein an abutting surface is formed on the second end of the linking component, and a mating surface is formed on the first restraining component for abutting against the abutting surface.

8. The safety belt automatic adjustment apparatus of claim 1, wherein the safety belt buckle fastening assembly comprises:
an installation component;
a rotary shaft installed on the installation component; and
an insertion component connected to the rotary shaft and for connecting with the safety belt buckle.

9. A child safety seat comprising:
a seat body;
a safety belt;
a safety belt buckle connected to the safety belt; and
a safety belt automatic adjustment apparatus for connecting with the safety belt buckle, the safety belt automatic adjustment apparatus comprising:
a safety belt buckle fastening assembly rotatably connected to the seat body and for connecting with the safety belt buckle;
a safety belt retractor for retracting the safety belt, the safety belt retractor comprising:
a restraining assembly for restraining a movement of the safety belt in a predetermined direction, the restraining assembly comprising a first restraining component and a second restraining component; and
a rotating shaft, the safety belt winding around the rotating shaft; and
a linking component installed between the safety belt buckle fastening assembly and the safety belt retractor, the safety belt buckle fastening assembly rotating to drive the linking component and the restraining assembly, so as to restrain or release the safety belt winding around the rotating shaft;
wherein the first restraining component and the second restraining component are driven by the linking component for respectively restraining rotations in opposite directions of the rotating shaft, a first end of the linking component is fixed on the safety belt buckle fastening assembly, and a second end of the linking component abuts against the first restraining component.

10. The child safety seat of claim 9, wherein the safety belt retractor further comprises:
a retractor installation component;
a first ratchet connected to an end of the rotating shaft; and
a second ratchet connected to another end of the rotating shaft.

11. The child safety seat of claim 10, wherein the first restraining component is installed on the retractor installation component in a swingable manner and for selectively engaging with or separating from the first ratchet, and a rotation in a first direction of the rotating shaft is restrained when the first ratchet is engaged with the first restraining component.

12. The child safety seat of claim 11, wherein the first restraining component is resiliently installed on the retractor installation component by a first resilient component.

13. The child safety seat of claim 11, wherein the second restraining component is installed on the retractor installation component in a swingable manner and for selectively engaging with or separating from the second ratchet, and a rotation in a second direction opposite to the first direction of the rotating shaft is restrained when the second ratchet is engaged with the second restraining component.

14. The child safety seat of claim 13, wherein the second restraining component is resiliently installed on the retractor installation component by a second resilient component.

15. The child safety seat of claim 9 wherein an abutting surface is formed on the second end of the linking component, and a mating surface is formed on the first restraining component for abutting against the abutting surface.

16. The child safety seat of claim 9, wherein the safety belt buckle fastening assembly comprises:
an installation component;
a rotary shaft installed on the installation component; and
an insertion component connected to the rotary shaft and for connecting with the safety belt buckle.

* * * * *